Jan. 5, 1954 K. R. LARSON 2,664,662
WEEDLESS FISHHOOK
Filed Oct. 22, 1952 2 Sheets-Sheet 1
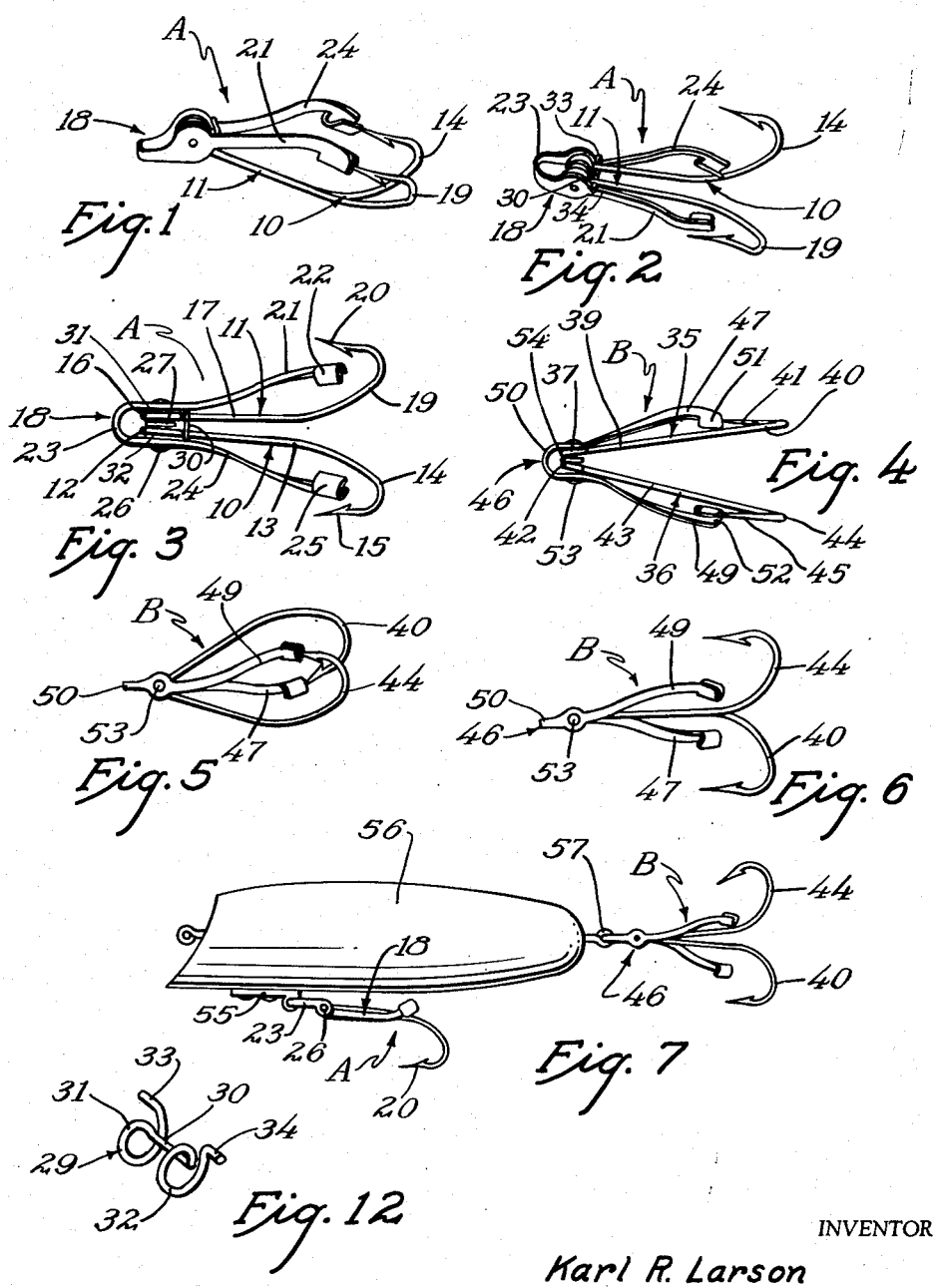
INVENTOR
Karl R. Larson
BY Robert M. Dunning
ATTORNEY Jan. 5, 1954

K. R. LARSON 2,664,662

WEEDLESS FISHHOOK

Filed Oct. 22, 1952

INVENTOR
Karl R. Larson
BY Robert M. Dunning
ATTORNEY

Patented Jan. 5, 1954

2,664,662

UNITED STATES PATENT OFFICE 2,664,662

WEEDLESS FISHHOOK

Karl R. Larson, Alton, Ill.

Application October 22, 1952, Serial No. 316,180

20 Claims. (Cl. 43—43.4)

My invention relates to an improvement in weedless fish hooks and deals particularly with a means of guarding the points of hooks so that they will not catch in weeds, sunken logs and other such objects.

Various types of guards have been provided for use in conjunction with fish hooks to prevent the hooks from catching in weeds and other objects. Most such devices comprise a resilient wire which extends forwardly of the point of the hook to fend off any weed, reed, or the like. If the resilient wire is of sufficient strength to properly serve its purpose, it also interferes to some extent with the operation of the hook when the hook is in the mouth of a fish. The present invention is designed to provide a guard which will function effectively in conjunction with weeds, but will not interfere with the operation of the hook when a fish takes the bait.

A feature of the present invention lies in the provision of a guard which is relatively rigid and non-resilient and which is designed to engage and guard the pointed ends of the hooks of a double or triple hook assembly. This guard is held in hook point engaging position by the resistance of the hook itself. As soon as a fish tends to take the bait so that pressure is applied upon the guard, the guard swings out of engagement with the hook points and pivots out of proximity with the points of the hooks. As a result once the guard is disengaged from the hook point the guard is no longer near the pointed ends of the hooks.

A feature of the present invention lies in the provision of a guard designed to engage the hook points of a pair of connected hooks. The guard is relatively rigid and the hook point is held in engagement thereby by springing the body of the hook. Once the guard has been sprung out of engagement with the hook points the guard is loosely pivoted to the hooks at the eye end thereof and therefore will not interfere with the operation of the hooks.

A feature of the present invention lies in the provision of a pair of hooks which are pivotally supported upon a common pivot passing through the eyes of the hooks. The hooks are loosely supported upon the pivot and are preferably spaced by a loose washer encircling the pivot between the hooks. The guard is connected to the hooks through the pivot and is engageable with the points of the hook only when the hook bodies are distorted or flexed to some extent. By disengaging the guard from the hook, the hooks are independently pivotal and the guard is pivotal relative to the hooks.

A feature of the present invention lies in the fact that the guard may be designed to engage a pair of hooks which are directed in the same general direction or may be applied to a pair of oppositely directed hooks. If preferred my guard may be attached to a triple hook assembly in which the hooks are arranged on planes at angles of approximately one hundred twenty degrees apart. When thus arranged all of the hooks are pivotal relative to each other and at least two of the hooks are preferably pivotal relative to the guard.

An added feature of the present invention lies in the provision of an assembly pivotally connected to a guard in such a way that the guard tends to pivot away from the hooks when disengaged therefrom. In the preferred form of my construction the pull of the line upon the hook assembly tends to pivot the hook away from the guard so as not to interfere therewith.

The present invention is a continuation of my previously filed application Serial No. 158,944, filed April 29, 1950, now abandoned.

These and other objects and novel features of my invention well be more clearly and fully set forth in the following specification and claims.

In the drawings forming a part of my specification:

Figure 1 is a perspective view of a hook assembly showing the guards engaged with the hook points.

Figure 2 is a view similar to Figure 1 showing the hooks disengaged from the guard.

Figure 3 is a plan view of the hook structure with the hooks disengaged from the guard.

Figure 4 is a top view of a modified form of construction in which the hooks are oppositely directed and are engaged with the guard.

Figure 5 is a side elevation view of the hook structure illustrated in Figure 4.

Figure 6 is a side elevational view similar to Figure 5 with the hooks disengaged from the guards.

Figure 7 is a side elevation view of a lure having attached thereto the hook structures illustrated in Figures 1 to 6, one form of construction being attached to the undersurface of the lure and the other type of construction being secured to the rear end thereof.

Figure 12 is a perspective view in enlarged form of the type of spring used in the construction illustrated in Figures 1, 2 and 3.

Figure 8:
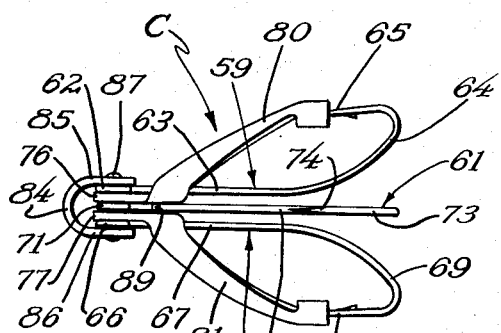
Figure 8 is a plan view of a triple hook assembly showing the construction thereof.

The hook guard may be made in several different forms, which are slightly different in construction, but which operate on a similar principle. One of these constructions is best illustrated in Figures 1, 2, and 3 of the drawings and the hook unit is indicated in general by the letter A.

The hook unit includes a pair of hooks 10 and 11 which are generally similar in form, but which have their hook ends angled in opposite directions. The hook 10 includes an eye 12 connected at one end of the hook shank 13. The hook end 14 is angled at a plane diverging from the plane of the eye 12. The pointed end 15 of the hook 10 is generally parallel to the shank 13 and is spaced substantially from the plane of the eye 12.

The hook 11 also includes an eye 16 connected to one end of the shank 17. The hook end 19 diverges away from the plane of the eye 16 so as to space the pointed hook end 20 at a substantial distance from the pointed hook end 15. In other words, while the shanks 13 and 17 of the hooks are substantially parallel the hooks are bent so that the points thereof are spaced a substantial distance apart.

The guard is indicated in general by the numeral 18. This guard includes a substantially rigid arm 21 having a channel shaped pocket 22 at its outer extremity. The arm 21 is connected by a looped end 23 to a second arm 24 having a channel shaped pocket 25 at its outer extremity. The portions of the arms 21 and 24 which are closely adjacent the looped end 23 extend in substantially parallel relation.

A pivot in the form of a rivet or anchored pin is indicated at 26 and extends through the parallel portions of the arms 21 and 24 and through the hook eyes 12 and 16. The pivot 26 also extends through a washer 27 loosely supported thereupon between the hook eyes 16 and 12. The arms 21 and 24 are sufficiently far apart so that the washer 27 is loose upon its shaft and so that there is a small amount of play between the various elements. It is necessary that the hooks pivot freely upon the pivot.

As illustrated in Figure 3 of the drawings, the arms 21 and 24 are so arranged that the channels 22 and 25 are spaced apart a distance somewhat different from the normal spacing of the hook points 15 and 20. In the form illustrated the channels 22 and 25 are somewhat closer together than the hook points 15 and 20 in normal position thereof. As also illustrated, the channels converge toward each other at an angle of about 30 degrees from the vertical. As a result the engaged hook point must spring inwardly slightly as it becomes disengaged. In attaching the hook points in the pockets 22, it is therefore necessary to flex the hooks together somewhat so that they engage resiliently in the channels 25 and 22 respectively. In bracing the hook ends together, the hook eyes twist somewhat about the pivot 26, the ends of the eyes being fixed outwardly and the outer ends of the eyes wedging against the washer 27. The hook shanks are somewhat resilient in nature and the arms 21 and 24 are spaced so that a slight flexing of the hooks is necessary to engage them in the channels 22 and 25. It is this resilient force against the channels which holds the hooks engaged therein.

Obviously the same result may be obtained by forming the arms 21 and 24 somewhat farther apart than the hook points 15 and 20. In such a case the hook shanks must be flexed apart to some extent in engaging them in the channels. Having the hooks normally wider than the guard has the advantage that the hooks normally project laterally beyond the width of the guard and will thus engage in the mouth of the fish somewhat more readily. Means may be provided for normally urging the guard away from the hook points so that the arms of the guard tend to extend in substantially parallel relation to the hook shanks. This may be accomplished by means of a spring illustrated in general by the numeral 29 and best shown in Figure 12. The spring 29 is shown as having an intermediate portion 30 designed to engage beneath the hook shanks 13 and 17 as they appear in Figure 1 of the drawings. A spiral loop 31 is connected to one end of the part 30 and a second spiral loop 32 is connected to the other end thereof. The spiral loops are wound in the same direction from the center member 30 and terminate in outwardly turned extremities 33 and 34 which engage above the arms 21 and 24 of the guard 18.

The spring 29 is so designed as to provide a tendency for the hook shanks to swing in a counter-clockwise direction from position shown in Figure 1 and for the guard 18 to swing in a clockwise direction, as viewed in this figure. As a result the arms of the guard are swung into a position generally parallel to the hook shanks when disengaged from the hook points. While the spring 29 is of advantage in moving the guard out of proximity with the hooks, it is not absolutely essential.

In Figures 4, 5, and 6 of the drawings I disclose a modified form of hook unit illustrated in general by the letter B. The unit B differs from the unit A mainly in the fact that the direction of the hooks is reversed. In other words, as indicated in Figure 1 of the drawings both of the hooks 10 and 11 are arranged with the hooks directed upwardly. In the unit B, one hook is directed upwardly and the other hook is directed downwardly.

As shown in these figures the unit B includes a hook 35 and a hook 36. The hook 35 includes an eye 37 and an elongated shank 39 connected thereto. This shank 39 is bent to form a hook end 40 terminating in a pointed extremity 41 normally substantially parallel to the hook shank 39. The hook 36 also includes an eye 42 having a shank 43 extending therefrom which merges into the hook end 44 and terminates in the pointed extremity 45. The pointed end 45 is generally parallel to the shank 43.

The guard is indicated in general by the numeral 46 and includes a pair of diverging arms 47 and 49 connected at a loop end 50. The arms 47 and 49 support channel shaped pockets 51 and 52 respectively, one pocket 51 being directed downwardly and the other pocket 52 opening upwardly.

A pivot 53 extends through the arms 47 and 49 near the loop end 50 thereof and also extends through the hook eyes 37 and 42. A washer 54 loosely encircles the pivot 53 between the hook eyes and the pivot 53 is of sufficient length to provide longitudinal play between the assembled parts.

The arms 47 and 49 diverge apart a distance from a plane normally containing the hook points 41 and 45, these hooks being arranged with their hook ends substantially in the same plane as the eyes 37 and 42 thereof. As a result in order to engage the two hooks with the channel shaped pockets 51 and 52, it is necessary to spread the hook ends of the hooks apart, causing a wedging action of the eye ends of the hooks upon the pivot. The arms are properly located so that the shanks of the hooks must be flexed to some extent in order to engage the pockets 51 and 52. The hooks are freely pivotal about the pivot 53 when released from these pockets.

It will be noted that in this form of construction, as in the previous unit A, when one hook is released from its pocket, the other hook may also be disengaged therefrom. In other words, the length of pivot is such that both hooks must be flexed outwardly to create the necessary tension to hold the hooks in place in their respective pockets. When one hook is disengaged the wedging action of the eye of this hook against the washer between the hooks is destroyed and the other hook is free to pivot.

In Figure 7 it will be noted that the loop 23 of the guard 18 is somewhat above the location of the pivot 26. As a result when the hooks are disengaged from the guard a pull between the hooks and the lure tends to straighten out the line of connection or pivot points between the guard and the hooks and between the guard and the bracket 55. As a result there is an inherent tendency for the guard 18 to swing upwardly toward the lure body and out of proximity with the hook points.

Figure 9:
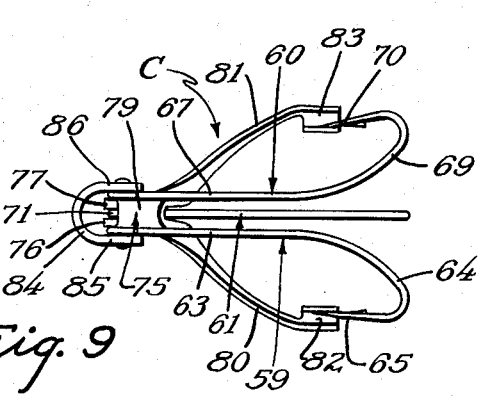
Figure 9 is a bottom plan view of the structure illustrated in Figure 8.
Figure 10:
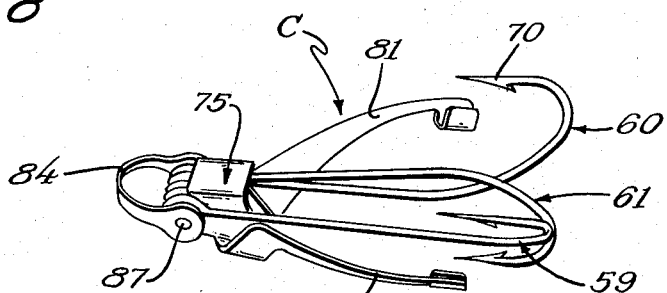
Figure 10 is a perspective view of the structure shown in Figures 8 and 9 with the hooks disengaged from their respective guards.

In Figures 8, 9 and 10 of the drawings I disclose a slightly different form of hook assembly which is illustrated in general by the letter C. This form of construction employs three different hooks which are arranged on planes substantially one hundred twenty degrees apart as is common with triple hooks.

The hook unit C includes a pair of relatively pivotal hooks 59 and 60 and a relatively pivotal intermediate hook 61. The hook 59 includes an eye 62 with a shank 63 extending on a plane at a substantial angle from the plane of the eye 62. The hook end 64 terminates in a hook point 65 generally parallel to the shank 63.

The hook 60 includes an eye 66 connected by a shank 67 to a hook end 69. This hook end is arranged on a plane at a substantial angle to the plane of the eye 66 so as to spread the pointed end 70 of the hook 60 at a substantial distance from the pointed end 65 of the hook 59.

The center hook 61 is provided with an eye 71 and a straight shank 72. The shank 72 is provided with a hook end 73 which is substantially on the plane of the hook eye 70. The pointed end 74 of the hook 61 is directed oppositely from the hook ends of the other two hooks 59 and 60.

A channel shaped element 75 includes a pair of parallel sides 76 and 77 and a connecting base 79. The sides 76 and 77 are spread apart a distance sufficient to accommodate the eye 71 of the hook 61 therebetween. A pair of outwardly diverging arms 80 and 81 are connected to the channel sides 76 and 77 and extend beneath the shanks 63 and 67 and incline upwardly and outwardly to a point spaced normally outwardly of the hook points 70 and 65. The arm 80 terminates in a channel shaped pocket 82, while the arm 81 terminates in a similar channel shaped pocket 83. These pockets 82 and 83 are designed to accommodate the hook points 65 and 70.

A U-shaped loop 84 is provided with parallel sides 85 and 86 extending on opposite sides of the hook eyes 62 and 66. A pivot 87 extends through the parallel ends of the loop 84 through the screw eyes 62, 66 and 71 and through the sides 76 and 77 of the channel shaped member 75. The hooks 64 and 69 are freely pivotal between the channel 75 and the sides of the loop 84 so that these hooks may pivot freely relative to the guard. The intermediate hook 61 is preferably held from pivotal movement relative to the guard by means of a locking pin 89 extending between the channel sides 76 and 77. This holds the pointed end 74 of the intermediate hook 61 inwardly of the shanks 63 and 67 of the hooks 59 and 60 so that these outer hooks protect the point of the intermediate hook when the hook points 65 and 70 are engaged in the pockets 82 and 83.

In the event a fish takes the bait and bites the hook, the hooks 65 and 70 spring free of the pockets 82 and 83 and are free to pivot individually. Thus the shanks of these hooks pivot out of proximity with the point 74 of the intermediate hook and the guard arms may pivot out of proximity with the hook points 65 and 70. The hooks are normally flexed apart to some extent in order to be retained in the pockets 82 and 83, the eyes of the hooks wedging against the channel member 75 and the shanks of the hooks being flexed somewhat in order to engage them with the pockets.

Figure 11:
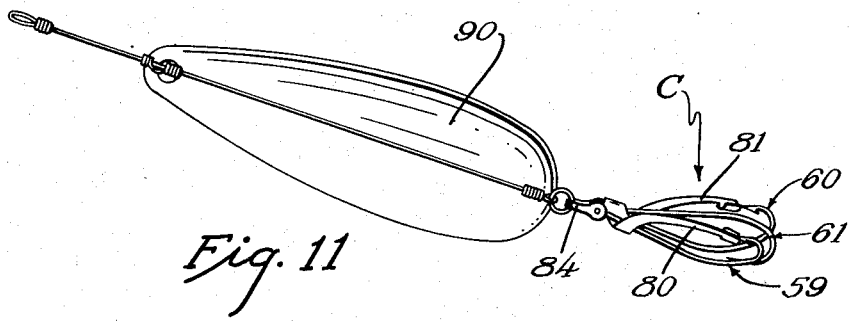
Figure 11 is a perspective view showing the hook structure of Figures 7, 8 and 9 attached to a spoon.

Figure 11 of the drawings shows the hook C attached to a spoon 90 of conventional shape. The spoon 90 may be connected to a line in the usual manner. The resulting structure is similar in general to spoons having triple hook assemblies at their extremity but differ therefrom in that the hook points of the triple hook are protected. At the same time when the hook enters the mouth of the fish, the guard snaps free of the hook points and the hook may be used in the conventional manner.

The present structure has the advantage of providing a guard which is relatively rigid in nature and which can not be easily disengaged from the hook points by passage of the structure through weeds or the like. The guards include a pair of diverging arms which tend to fend off weeds or similar objects so that they can not engage the points of the hooks. At the same time, once the hooks are free of the guards, the hooks may pivot freely away from the guard so that they may operate in the usual manner without interference from the guard.

In accordance with the patent statutes, I have described the principles of construction and operation of my weedless fish hooks, and while I have endeavored to set forth the best embodiments thereof, I desire to have it understood that obvious changes may be made within the scope of the following claims without departing from the spirit of my invention.

I claim:

1. A weedless fish hook unit including a pair of substantially rigid arms, a pair of fish hooks having eyes at one end pivotally connected to said arms, the opposite ends of the hooks being normally free, said arms diverging from said pivot connection, and hook engaging means on the outer ends of said arms, said hook engaging means being spaced apart a distance substantially different from the distance between the extremities of the free ends of said hooks and said hooks being resiliently flexed for engagement with said hook engaging means.

2. The structure described in claim 1 in which said arms are connected together for movement in unison.

3. The structure described in claim 1 and in which the hook engaging means comprises channel shaped pockets.

4. The structure described in claim 1 and including a washer loosely supported between the hook eyes.

5. A weedless hook comprising a pair of substantially rigid arms connected together at one end thereof, said arms diverging from said connected end, a pivot extending between said arms, a pair of hooks pivotally supported by said pivot, said hooks being pivotal relative to said arms, said hooks having free outer ends, and hook engaging means on the ends of said arms engageable with said free ends, said hook engaging means being spaced apart a distance substantially different from the distance between the extremities of said free ends, and said hooks being under tension when either the arms or the hooks are flexed to permit the hooks to engage with said hook engaging means.

6. A weedless hook including a guard including a pair of arms, means connecting the arms at one end thereof, said arms diverging at their other ends, a pivot extending between said arms, a pair of hooks freely pivotal upon said pivot, said hooks having free outer ends terminating in points, and hook point engaging means on the outer ends of said arms, said hook ends being arranged in diverging planes to space the hook points a substantial distance apart, said hook point engaging means being spaced apart a distance substantially different from the normal spacing between said hook points and said hooks being under tension when either the arms or the hooks are flexed to permit the hooks to engage in said hook point engaging means.

7. The structure described in claim 6 in which the hook point engaging means are normally closer together than said hook points.

8. The structure described in claim 6 and including a washer loosely encircling said pivot between said hooks.

9. The structure described in claim 6 and including wherein said means is located at the opposite side of the pivot to that of the location of the arms.

10. The structure described in claim 6 and including spring means for urging said hook point engaging means away from said hook points.

11. The structure described in claim 6 and including a loop connection between said arms offset from said pivot so that a pull on the loop tends to pivot said hook point engaging means out of contact with said hook points when a fish exerts a pull on one of the hooks.

12. A weedless hook including a substantially rigid guard having a pair of spaced arms, means connecting said arms, a pivot extending between said arms, a pair of hooks pivotally supported by said pivot, said hooks having pointed hook ends and being oppositely disposed so that the hook end of one hook extends in substantially an opposite direction from the hook end of the other hook, and hook engaging means on the extremities of said arms, said hook engaging means being spaced laterally a distance somewhat different from the lateral spacing of the points of the hooks and said hooks being adapted to be flexed laterally into engagement in said hook engaging means.

13. The structure described in claim 1 and in which the free ends of the hooks are directed in opposite directions.

14. The structure described in claim 13 and including a washer loosely supported upon said pivot between said hooks.

15. A weedless fish hook including a pair of substantially rigid connected arms arranged in spaced relationship, a pivot extending between said arms, a pair of hooks having eyes at one end and hook ends at the other end, said eyes encircling said pivot on opposite sides of said arms, and freely pivotal thereupon, the hook ends of said hooks being arranged in spaced relation to space the hook points apart, means on the ends of said arms engaging said hook points, said hook point engaging means being spaced apart a distance different from the normal spacing between the planes of said hook points and said hooks adapted to be flexed to engage with said hook point engaging means, and a third hook having an eye at one end and a hook end at the other end, said eye encircling said pivot between said arms.

16. A weedless fish hook unit including a pair of substantially rigid arms, a pair of resilient fish hooks, means pivotally connecting the hooks to said arms, said arms diverging from said pivot connection, and hook engaging means on the outer ends of said arms, said hook engaging means being spaced apart a distance substantially different from the distance between the extremities of the hook ends of said hooks and said hooks being adapted to be resiliently flexed for engagement with said hook engaging means.

17. A weedless fish hook unit including a pair of guard arms and a pair of pointed fish hooks having eyes at one end thereof, a pivot pivotally connecting said eyes and said arms near one end of said arms, hook point engaging means on the other ends of said arms, the distance between the points of said hooks in a direction parallel to the axis of said pivot being normally substantially different than the spacing between said hook point engaging means on said arms, said hooks and arms being under tension when the arms or the hooks are flexed so that both hook points are engaged with said hook point engaging means on said arms.

18. A weedless fish hook unit including a pair of substantially rigid guard arms and a pair of pointed fish hooks having a pivot aperture at the ends thereof opposite the pointed ends, a pivot extending through said pivot apertures and through said arms near one end thereof, hook point engaging means on the other ends of said arms, each said hook pointed end being spaced from the hook point engaging means in a direction parallel to the axis of said pivot, said hooks and said arms being under tension when said hooks or arms are flexed so that the hook points are engaged with their respective hook point engaging means.

19. A weedless fish hook including a guard arm, a hook point engaging means on said guard arm, said guard arm having a pivot aperture therethrough at a point spaced from said hook point engaging means, a fish hook having a pointed end and having a pivot aperture near the opposite end thereof, a pivot extending through said apertures, means limiting the separation of said arm and said hook at their pivoted ends, said hook point being normally spaced from said engaging means in a direction parallel to the axis of said pivot, the flexing of the hook or arm permitting the engagement of said hook point with said engaging means and placing tension on said arm and hook and tending to twist the axes of said pivot apertures out of alignment with the axis of said pivot.

20. A weedless fish hook including a pair of guard arms, hook point engaging means at one end of each said arm, said arms each having a pivot aperture near the other ends thereof, a pair of hooks each having a pointed end and having a pivot aperture near the other end thereof, a pivot extending through said pivot apertures, each said hook engaging means being designed to accommodate a corresponding hook point, and means limiting the separation of said arms and hooks on said pivot, each said hook point being normally spaced from its corresponding hook point engaging means, flexing of said arms or hooks permitting the engagement of said hook points and said engaging means to place tension in said arms and hooks and tending to swing the axes of said hooks and said arms out of alignment with the axis of said pivot.

KARL R. LARSON.

No references cited.